INVENTOR
HANS KLEMPERER

Patented Mar. 1, 1949

2,462,872

UNITED STATES PATENT OFFICE 2,462,872

INVERTER

Hans Klemperer, Belmont, Mass., assignor to Raytheon Manufacturing Company, Newton, Mass., a corporation of Delaware Application February 27, 1946, Serial No. 650,714

6 Claims. (Cl. 250—36)

This invention relates to inverters, and more particularly to high-frequency inverters using space discharge devices.

An object of this invention is to devise an inverter using a gas tube which is self-excited.

Another object of the invention is to provide a high-frequency inverter circuit using a gas tube, in which the grid excitation for said tube is provided by circuit elements, without the necessity of providing a separate source for excitation.

Figure 1:
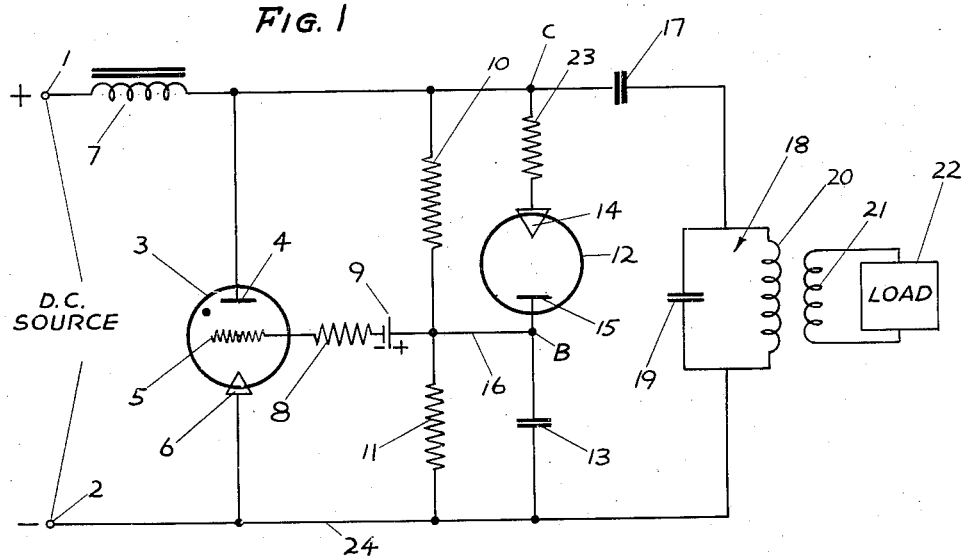

The foregoing and other objects of the invention will be best understood from the following description of an exemplification thereof, reference being had to the accompanying drawing, wherein:

Fig. 1 is a diagram of an embodiment of the invention; and

Figure 2:
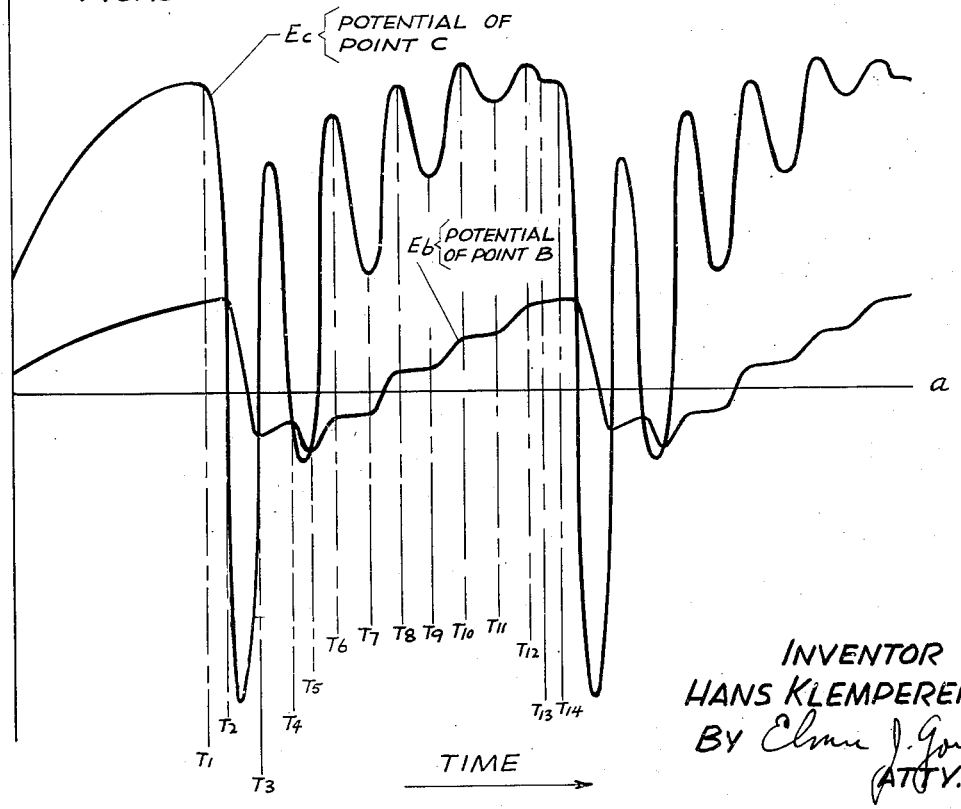

Fig. 2 contains a set of curves illustrating the mode of operation of the system shown in Fig. 1.

In Fig. 1 direct current is adapted to be connected to input terminals 1 and 2. A space discharge tube 3, preferably a hydrogen-filled thyratron, is provided, having plate or anode 4, grid 5, and cathode 6. The cathode 6 is preferably of the permanently-energized type, as, for example, a thermionic filament. Anode 4 is connected to the positive terminal 1 of the source through an impedance 7 which is preferably an inductance. Cathode 6 is connected to the negative terminal 2 of the source. Grid 5 is connected through a resistance 8 and a biasing battery 9 to one end of a resistance 10, the other end of which is connected to anode 4 and thereby also to terminal 1 of the source. A resistance 11 is connected between the grid end of resistance 10 and the negative terminal 2 of the source. A diode rectifier 12, a condenser 13, and a resistor 23 are connected in series across the source 1—2. The permanently-energized cathode 14 of the rectifier, as, for example, a thermionic filament, is connected to positive terminal 1 of the source and anode 15 of rectifier 12 is connected to condenser 13. A stub conductor 16 connects the grid end of resistance 10 to anode 15 and also to the upper plate of condenser 13. A condenser 17 is connected between anode 4 and one side of a tank or resonant circuit 18, the opposite side of said resonant circuit being connected to the negative terminal 2 of the source. Tuned circuit 18 is a parallel resonant circuit, and comprises a condenser 19 and an inductance 20 in parallel. Inductively coupled to inductance 20 is a coil 21, the opposite ends of which are connected to any suitable load 22.

When the system of Fig. 1 is energized, condensers 13 and 17 both begin to be charged from the source 1—2, condenser 13 charging through inductance 7 and resistance 10 and condenser 17 charging through inductance 7 and low inductance 20. Condenser 13 charges exponentially at a rather slow rate, because of resistance 10 in series therewith, and charges with a polarity such that the grid side B of said condenser attains a positive potential with respect to the cathode side or lead 24. Condenser 17 charges rather rapidly, due to the absence of series resistance. The left-hand side C of condenser 17 attains a potential positive with respect to lead 24, the negative side of the source. Resistor 11, which is connected across condenser 13, has a large value of resistance and therefore does not appreciably interfere with the charging of said condenser. This resistance is not absolutely necessary, and it acts, in combination with resistance 10, as a voltage divider to keep the full voltage of the high-voltage source 1—2 away from grid 5 of tube 3.

When condenser 13 has been charged to a certain extent, so that point B attains a certain positive potential with respect to cathode lead 24, the negative grid bias supplied by battery 9 is overcome and tube 3 is allowed to fire. Condenser 17 discharges rapidly through tube 3 and tank circuit 18 in series. This impulse going through resonant circuit 18 shock-excites the tank circuit, causing an oscillatory voltage to appear therein and to be applied to the load. When a condenser is discharged through a gas tube and a resonant circuit in series, with the above polarities, to produce shock-excited oscillations in said resonant circuit, the first half-cycle of the oscillatory voltage produced will be in the negative direction. This means that point C will be driven negative with respect to cathode lead 24, to a potential substantially as much negative as it was positive before tube 3 fired, and this point C will go negative, in a substantially sinusoidal manner, a very short time after tube 3 is fired. In fact, by the shock-excitation of tuned circuit 18, a train of damped substantially sinusoidal oscillations will be produced, having a frequency determined by the resonant frequency of tuned circuit 18. Tube 3 is extinguished when the potential of point C (which is connected to anode 4 thereof) reaches a value, with respect to cathode lead 24, less positive than that necessary to maintain the arc discharge therein. Also, when point C is driven negative with respect to cathode lead 24, current flows through rectifier 12 and resistance 23 in the direction to reverse the polarity of the charge on condenser 13, thus making the potential of point B go negative with respect to cathode lead 24. Due to the current-limiting resistor 23, however, this change of potential of point B will not be effected as rapidly as the change of potential of point C.

It is necessary, in order for a gas tube to be operated as an oscillator, that the periodicity of the oscillations be at least as great as the deionization of the tube, so that proper control of firing of the tube may be achieved. Even though the tube has become deionized, however, after it is extinguished and before the anode again goes positive, proper firing control requires that the grid potential be again negative at least by the time the anode again reaches a positive potential sufficient to cause the arc to strike in the tube. In this invention, the presence of the rectifier 12 insures that the potential of grid 5 will automatically go negative directly in response to oscillatory voltages produced in resonant circuit 18.

After tube 3 has fired, the potential of point C with respect to lead 24 will be varied by two separate voltages, one being the damped sinusoidal oscillations in the tank circuit and the other being the source 1—2 which tends to recharge condenser 17 to the relative potential it had before tube 3 was fired. After condenser 13 has been affected in such a way that the potential of point B has been driven negative with respect to lead 24, due to the oscillations, as stated above, the potential of point B with respect to lead 24 will also be varied by two separate voltages, one being the source 1—2 tending to recharge condenser 13 to its original relative potential (the potential it had before tube 3 was first fired), and the other being the variations of potential of point C, which are applied either through rectifier 12 or resistor 10 to point B. The potential of point C will eventually, as a result of the dying out of the oscillations and the charging effect of the source 1—2, again reach its original high positive potential with respect to lead 24. When point B, as a result of the two voltages affecting it, has again reached a certain positive potential, tube 3 will again be fired as before and conductor 17 will again discharge through it to apply another pulse of current or "kick" to tank circuit 18. This "kick" will again shock-excite tank circuit 18 to produce oscillations, as before, driving the potentials of points C and B negative again, with respect to cathode lead 24, and the above variations will be repeated.

Fig. 2 shows a set of curves illustrating schematically the operation of the circuit of Fig. 1. These curves are not intended to show in a quantitative manner what happens in Fig. 1, but they do indicate qualitatively the operation of the system. Zero axis $a$ represents the potential of cathode lead 24, and two curves $E_b$ and $E_c$ are shown, $E_b$ representing the potential of point B and $E_c$ representing the potential of point C, both with respect to time. The system is considered as being energized a short time to the left of the left-hand edge of this figure. Between the edge of the figure and time $T_1$, the potentials of point C and B are both increasing positively due to the charging of respective condensers 17 and 13, $E_c$ having a greater slope than $E_b$ because condenser 17 is charged at a faster rate than condenser 13. At time $T_1$, the potential of point B has reached a value sufficiently positive to fire tube 3, discharging condenser 17, shock-exciting tuned circuit 18, and driving the potential of point C negative. Between times $T_1$ and $T_2$, at which latter time $E_c$ crosses the zero axis and begins to go negative, condenser 13 continues to be charged from the source, so that $E_b$ continues to rise. Beyond time $T_2$, $E_c$ goes negative, carrying $E_b$ negative along with it, although $E_b$ does not go negative as rapidly as $E_c$ because of the limiting effect of resistor 23. The potential $E_c$ begins to go in the positive direction again after it has reached its maximum negative value, because of the fact that damped sinusoidal oscillations are established in tank circuit 18. The potential $E_b$ continues to go negative until time $T_3$, at which time $E_c$ in its upward swing reaches a value of potential equal to that reached by $E_b$, after which $E_b$ has nothing to drive it further negative, so that it begins to travel in the positive direction as condenser 13 begins to again charge from the source 1—2. It should be remembered that $E_b$ is responsive to two potentials at all times (the oscillating potential at point C and the potential of source 1—2), but between times $T_2$ and $T_3$ the oscillating potential $E_c$ overcomes the effects of the source, driving $E_b$ negative. Beyond time $T_3$ the potential $E_c$ is more positive than $E_b$ and is increasing in the positive direction, so that $E_b$ moves in the positive direction as condenser 13 charges from the source 1—2. It will be remembered that, beyond time $T_2$, the potential $E_c$ varies due to two causes, one being the damped sinusoidal oscillations in the tank circuit and the other being the source 1—2 which tends to recharge condenser 17 in such a way that the potential of point C will again attain its original high positive value. Therefore, beyond time $T_2$ the curve $E_c$ is, as shown in Fig. 2, the resultant of these two causes.

Beyond time $T_3$, therefore, $E_b$ increases in the positive direction, until a time $T_4$, at which time $E_c$ in its second downward swing reaches a potential equal to that reached by $E_b$, and, since it is still traveling in the negative direction, $E_b$ is forced more negative along with it, although again not as rapidly as $E_c$ because of resistor 23. At time $T_5$, $E_c$ reaches a point in its upward swing which is again equal to the potential $E_b$, so that beyond $T_5$, $E_b$ again begins to increase in the positive or upward direction. Beyond time $T_5$, until tube 3 again fires, $E_b$ is not again driven in the negative direction because $E_c$ does not during this interval go negative with respect to lead 24. However, at times $T_6$, $T_7$, $T_8$, $T_9$, $T_{10}$, $T_{11}$, and $T_{12}$, and between these times, variations from the general exponential upward trend of $E_b$ occur because $E_c$ is alternately opposing and aiding the voltage of source 1—2 in its effect on $E_b$. At time $T_{13}$, the oscillations of $E_c$ have died away, so that curve $E_c$ is horizontal from this time until time $T_{14}$ (at which tube 3 again fires), because $E_c$ has reached its quiescent value, with condenser 17 fully charged. Beyond time $T_{13}$, until $E_c$ again goes negative after the second firing of tube 3, $E_b$ varies in smooth exponential fashion, as condenser 13 continues to charge. At time $T_{14}$, tube 3 again fires to discharge condenser 17 and shock-excite tank circuit 18, because at this time $E_b$ has reached a positive value high enough to allow the arc to strike. The above-described variations of $E_b$ and $E_c$ are then repeated.

The circuit of the invention provides its own grid excitation for gas tube 3, without the necessity of using a separate source, and high-frequency oscillations are produced for utilization in the load device, by means of gas tube 3. Inductance 7 serves to keep high frequencies out of the source 1—2, and also as a means for regulating the charging current of condenser 17. Resistance 23, in the cathode circuit of rectifier 12, serves to limit the current through said rectifier, thus protecting the cathode if a gaseous rectifier is used. This resistance is not essential if a high-vacuum rectifier is used in the circuit.

The tube 3 may be any thyratron or hot-cathode arc discharge device. If high output frequencies are desired, it is preferable to use, for tube 3, a hydrogen-filled thyratron, because the deionization time of such a thyratron is less than that of a mercury-vapor thyratron, for example. The frequency obtainable is, as stated above, limited by the deionization time of the main gas tube.

Of course, it is to be understood that this invention is not limited to the particular details as described above, as many equivalents will suggest themselves to those skilled in the art. For example, the grid-biasing battery 9 may be omitted. In some cases the resistor 11 is not necessary and may be omitted. Various types of rectifiers, thermionic or dry, may be used in the circuit in the position of rectifier 12. Various other variations will suggest themselves. It is accordingly desired that the appended claims be given a broad interpretation commensurate with the scope of this invention within the art.

What is claimed is:

1. An inverter including, in combination, a first capacitance, means for charging said capacitance with a predetermined polarity, a second capacitance, means for charging said second capacitance with said predetermined polarity through a circuit having a predetermined time constant, means for discharging said first capacitance through a resonant circuit to shock-excite said resonant circuit into oscillation at its resonant frequency and to reverse the polarity of the voltage across said first capacitance, and means connecting said second capacitance in series with a unilateral conducting device across said first capacitance and said resonant circuit, said device being so poled that it will conduct only in such a direction as to charge said second capacitance with a polarity opposite to said predetermined polarity, whereby when the polarity of the voltage across said first capacitance reverses that across said second capacitance will rapidly reverse.

2. An inverter including, in combination, a first capacitance, means for charging said capacitance with a predetermined polarity, a second capacitance, means for charging said second capacitance with said predetermined polarity through a circuit having a predetermined time constant, means responsive to a voltage of said predetermined polarity on said second capacitance for discharging said first capacitance through a resonant circuit to shock-excite said resonant circuit into oscillation at its resonant frequency and to reverse the polarity of the voltage across said first capacitance, and means connecting said second capacitance in series with a unilateral conducting device across said first capacitance and said resonant circuit, said device being so poled that it will conduct only in such a direction as to charge said second capacitance with a polarity opposite to said predetermined polarity, whereby when the polarity of the voltage across said first capacitance reverses that across said second capacitance will rapidly reverse.

3. An inverter including, in combination, a first capacitance, means for charging said capacitance with a predetermined polarity, a second capacitance, means for charging said second capacitance with said predetermined polarity through a circuit having a predetermined time constant, a controllable gaseous discharge device having its anode-cathode path connected in series with a resonant circuit across said first capacitance to provide a discharge circuit therefor, whereby when said device is rendered conductive said first capacitance will discharge through said resonant circuit to shock-excite said circuit into oscillation at its resonant frequency and whereby the polarity of the voltage across said first capacitance will be reversed, and means connecting said second capacitance in series with a unilateral conducting device across said first capacitance and said resonant circuit, said unilateral device being so poled that it will conduct only in such a direction as to charge said capacitance with a polarity opposite to said predetermined polarity, whereby when the polarity of the voltage across said first capacitance reverses that across said second capacitance will rapidly reverse.

4. An inverter including, in combination, a first capacitance, means for charging said capacitance with a predetermined polarity, a second capacitance, means for charging said second capacitance with said predetermined polarity through a circuit having a predetermined time constant, a grid-controlled gaseous discharge device having its anode-cathode path connected in series with a resonant circuit across said first capacitance to provide a discharge circuit therefor, whereby when said device is rendered conductive said first capacitance will discharge through said resonant circuit to shock-excite said circuit into oscillation at its resonant frequency and whereby the polarity of the voltage across said first capacitance will be reversed, means connecting the grid of said device to said second capacitance to render said second device conductive in response to a voltage of said predetermined polarity on said second capacitance, and means connecting said second capacitance in series with a unilateral conducting device across said first capacitance and said resonant circuit, said unilateral device being so poled that it will conduct only in such a direction as to charge said capacitance with a polarity opposite to said predetermined polarity, whereby when the polarity of the voltage across said first capacitance reverses that across said second capacitance will rapidly reverse and a voltage opposite to said predetermined polarity will be applied to said grid.

5. An inverter including, in combination a first condenser, means for charging said condenser from a source of direct current with a predetermined polarity, a second condenser, means for charging said second condenser from said source with said predetermined polarity through a circuit having a predetermined time constant, means for discharging said first condenser through a resonant circuit to shock-excite said resonant circuit into oscillation at its resonant frequency and to reverse the polarity of the voltage across said first condenser, and means connecting said second condenser in series with a unilateral conducting device across said first condenser and said resonant circuit, said device being so poled that it will conduct only in such a direction as to charge said second condenser with a polarity opposite to said predetermined polarity, whereby when the polarity of the voltage across said first condenser reverses that across said second condenser will rapidly reverse.

6. An inverter including, in combination, a first condenser, means for charging said condenser from a source of direct current with a predetermined polarity, a second condenser, means for charging said second condenser from said source with said predetermined polarity through a circuit having a predetermined time constant, means for discharging said first condenser through a resonant circuit to shock-excite said resonant circuit into oscillation at its resonant frequency and to reverse the polarity of the voltage across said first condenser, and means connecting said second condenser in series with a unilateral conducting device across said first condenser and said resonant circuit, said device being so poled that it will conduct only in such a direction as to charge said second condenser with a polarity opposite to said predetermined polarity, whereby when the polarity of the voltage across said first condenser reverses that across said second condenser will rapidly reverse, the condensers remaining connected to said source to be recharged therefrom with said predetermined polarity after said discharging means has operated.

HANS KLEMPERER.

REFERENCES CITED

The following references are of record in the file of this patent:

UNITED STATES PATENTS

| Number | Name | Date |
|---|---|---|
| 2,071,958 | Watrous, Jr. | Feb. 23, 1937 |
| 2,391,894 | Gorham et al. | Jan. 1, 1946 |
| 2,411,898 | Schelleng | Dec. 3, 1946 |
| 2,416,718 | Shockley | Mar. 4, 1947 |